(12) United States Patent
Ludwig et al.

(10) Patent No.: US 12,147,434 B2
(45) Date of Patent: Nov. 19, 2024

(54) RANKING FILTER ALGORITHMS

(71) Applicant: SAP SE, Walldorf (DE)

(72) Inventors: Michael Ludwig, Leimen (DE); Johannes Merx, Heidelberg (DE)

(73) Assignee: SAP SE, Walldorf (DE)

( * ) Notice: Subject to any disclaimer, the term of this patent is extended or adjusted under 35 U.S.C. 154(b) by 567 days.

(21) Appl. No.: 16/832,419

(22) Filed: Mar. 27, 2020

(65) Prior Publication Data

US 2021/0303583 A1  Sep. 30, 2021

(51) Int. Cl.
*G06F 16/2457* (2019.01)
*G06F 16/22* (2019.01)

(52) U.S. Cl.
CPC .... *G06F 16/24578* (2019.01); *G06F 16/2228* (2019.01)

(58) Field of Classification Search
CPC ........................ G06F 16/24578; G06F 16/2228
See application file for complete search history.

(56) References Cited

U.S. PATENT DOCUMENTS

| | | | | |
|---|---|---|---|---|
| 2006/0224634 A1* | 10/2006 | Hahn | ................... | G06F 16/2358 |
| 2013/0159339 A1* | 6/2013 | Thomsen | .............. | G06F 16/148 |
| | | | | 707/769 |
| 2013/0166589 A1* | 6/2013 | Baeumges | ........ | G06F 16/24532 |
| | | | | 707/769 |
| 2014/0025651 A1* | 1/2014 | Schreter | .............. | G06F 12/0261 |
| | | | | 707/E17.007 |
| 2015/0120746 A1* | 4/2015 | Mindnich | ............. | G06F 16/258 |
| | | | | 707/754 |
| 2016/0350374 A1* | 12/2016 | Weyerhaeuser | ...... | G06F 16/285 |
| 2017/0161325 A1* | 6/2017 | Rastogi | ............. | G06F 16/24542 |
| 2018/0129374 A1* | 5/2018 | Kim | ....................... | G06F 16/254 |
| 2019/0311043 A1* | 10/2019 | Bakulina | .................. | G06F 7/08 |
| 2019/0354407 A1* | 11/2019 | Booss | ................... | G06F 16/256 |

\* cited by examiner

*Primary Examiner* — Jensen Hu
(74) *Attorney, Agent, or Firm* — Mintz Levin Cohn Ferris Glovsky and Popeo, P.C.

(57) ABSTRACT

A method, a system, and a computer program product for executing a query. A query associated with a calculation scenario defining a data flow model that includes one or more calculation nodes is received. Each calculation node corresponds to an operation being performed on one or more database tables stored at a database. The calculation nodes include a first calculation node corresponding to a ranking filter operation. A calculation engine executes the calculation scenario and performs the ranking filter operation to generate a data structure storing a plurality of rows of the database tables. Based on the executing of the calculation scenario, a result data set including at least one row from the plurality of rows is generated and provided by a database server to an application server.

16 Claims, 11 Drawing Sheets

| ROW_NUM | $O_1$ | $O_2$ | $P_1$ | $P_2$ |
|---|---|---|---|---|
| 1 | 2 | 1 | A | B |
| 2 | 2 | 2 | A | B |
| 3 | 4 | 5 | A | B |
| 1 | 2 | 7 | B | A |
| 2 | 3 | 7 | B | A |
| 1 | 2 | 7 | B | B |
| 2 | 3 | 4 | B | B |

| | $O_1$ | $O_2$ | $P_1$ | $P_2$ |
|---|---|---|---|---|
| 1 | 2 | 1 | A | B |
| 2 | 2 | 2 | A | B |
| 3 | 3 | 4 | B | B |
| 4 | 2 | 7 | B | A |
| 5 | 2 | 7 | B | B |
| 6 | 4 | 5 | A | B |
| 7 | 3 | 7 | B | A |

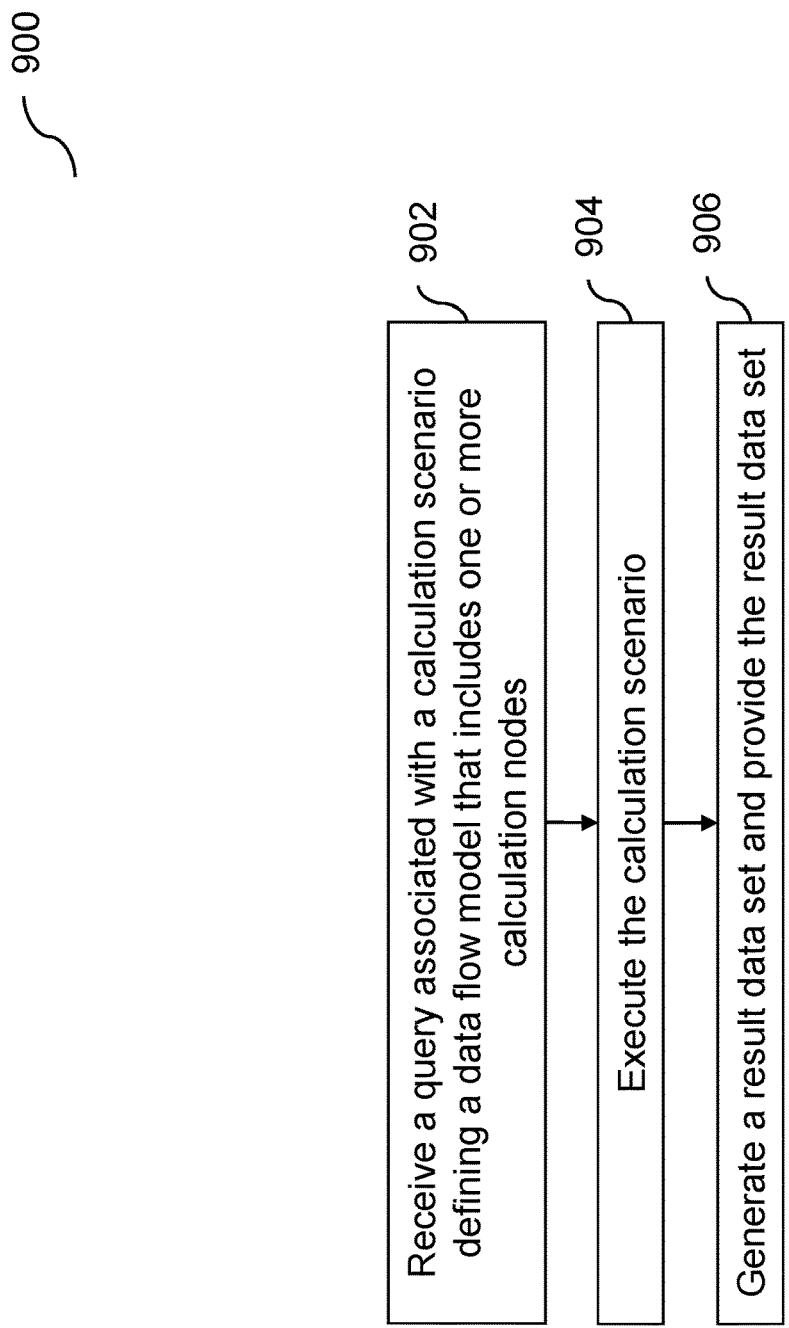

RANKING FILTER ALGORITHMS

TECHNICAL FIELD

This disclosure relates generally to data processing and, in particular, to database calculation engines with ranking filter algorithms.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In some implementations, the current subject matter relates to a computer implemented method for executing a query. The method may include receiving, by a database server from an application server, a query associated with a calculation scenario defining a data flow model that includes one or more calculation nodes. Each calculation node may correspond to an operation being performed on one or more database tables stored at a database. The calculation nodes may include a first calculation node corresponding to a ranking filter operation. The method may also include executing, by a calculation engine, the calculation scenario. The execution of the calculation scenario may include performing the ranking filter operation to generate a data structure storing a plurality of rows of the database tables. The method may further include generating, based on the executing of the calculation scenario, a result data set including at least one row from the plurality of rows and providing, by the database server to the application server, the result data set.

In some implementations, the current subject matter may include one or more of the following optional features. The generated data structure may include a mapping of each row in the plurality of rows to one or more partitions of the one or more database tables processed by the calculation engine during execution of the calculation scenario. Further, the generating may further include selecting the at least one row in the result data set from the plurality of rows based on the mapping.

In some implementations, at least one partition in the mapping may be configured to map to another data structure storing one or more rows for inclusion in the result data set. The result set may include a predetermined number of rows. The rows in the other data structure may be selected based on one or more ordering attributes defining a predetermined order of execution of operations of the received query on the partitions of the database tables.

In some implementations, the generating may include splitting the one or more database tables into one or more parts, generating, for each one or more parts, a partial result data set in a plurality of partial result data sets, each partial result data set, and combining the plurality of generated partial result data sets in the result data set.

In some implementations, the calculation engine may invoke an SQL processor for executing set operations.

Further, an input for each calculation node may include one or more of: a physical index, a join index, an OLAP index, and another calculation node. Each calculation node may have at least one output table that is used to generate the data set. At least one calculation node may consume an output table of another calculation node. The database may be a column-oriented in-memory database.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3a illustrates an exemplary database table including intermediate results prior to application of ranking filtering function;

FIG. 3b illustrates an exemplary database table that may be used as an input to the ranking filter function, according to some implementations of the current subject matter;

FIG. 9 is an exemplary method, according to some implementations of the current subject matter.

DETAILED DESCRIPTION

To address these and potentially other deficiencies of currently available solutions, one or more implementations of the current subject matter relate to methods, systems, articles of manufacture, and the like that can, among other possible advantages, provide database calculation engines with ranking filter algorithms.

Data flow between an application server and a database server may be dependent on the scope and quantity of queries generated by the application server. Complex calculations may require executing numerous queries at the database server, which in turn may consume significant resources for transporting data to the application server and also processing the data at the application server. As such, in some example embodiments, a calculation engines may be deployed in order to perform complex calculations having numerous queries. For example, the calculation engine may be configured to execute calculation scenarios modeling complex queries. Instead of multiple individual queries, the calculation engine may execute a query invoking a calculation scenario. The calculation scenario may include a plurality of nodes, each of which corresponding to an operation performed on a database table. Moreover, the calculation scenario may be modeled in a generic manner including by exposing a selection of attributes that may be applied at each node in the calculation scenario. The query may thus invoke the calculation scenario by specifying one or more of the attributes.

Figure 1:
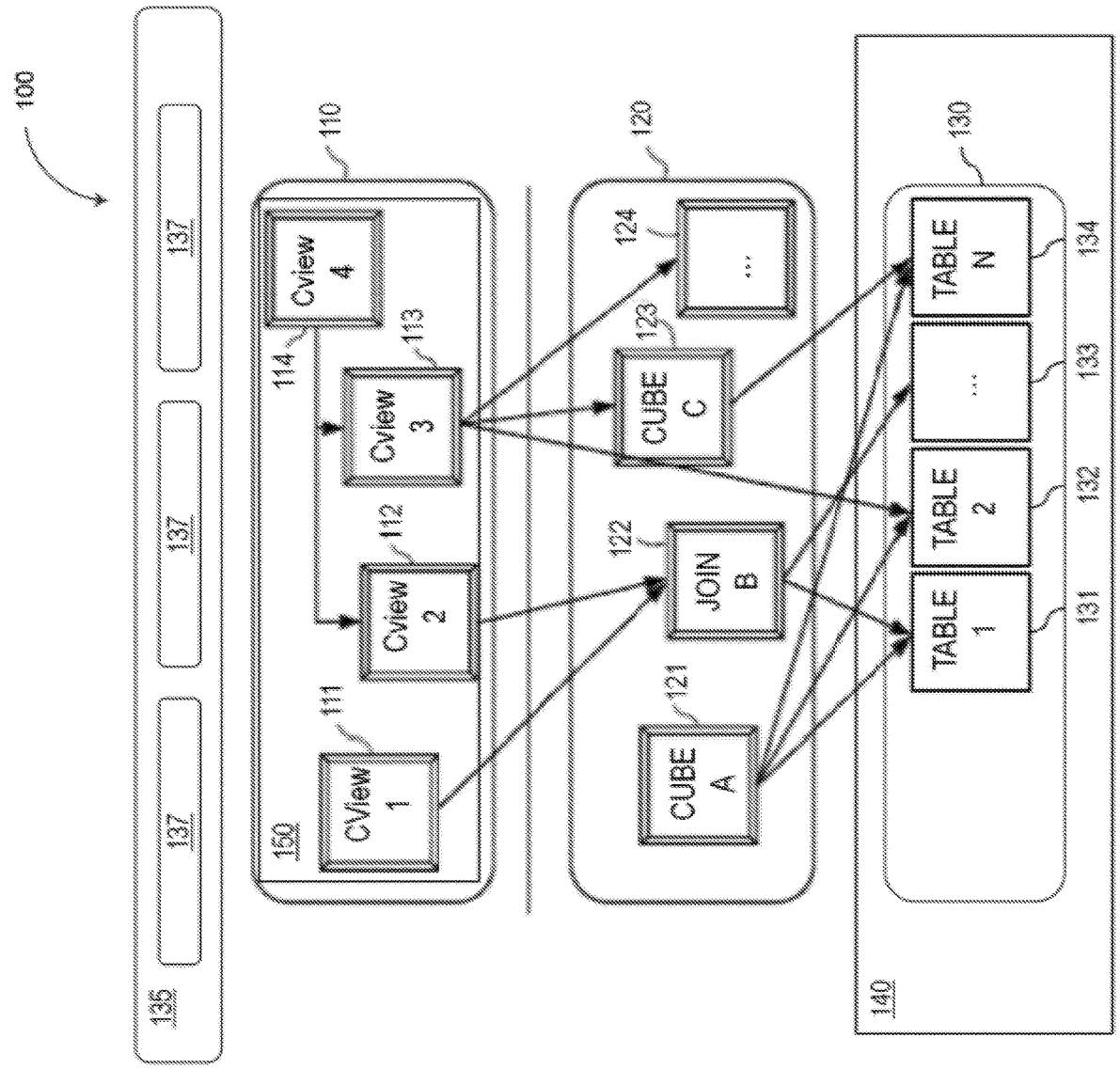
FIG. 1 illustrates an exemplary database system, according to some implementations of the current subject matter.

FIG. 1 illustrates an exemplary database system 100, according to some implementations of the current subject matter. The database system 100 may include one or more layers including, for example, a calculation engine layer 110, a logical layer 120, and a physical table-pool 130. One or more application servers 135 implementing database client applications 137 may access the database system 100. Calculation scenarios may be executed by a calculation engine, which may form part of a database or which may be part of the calculation engine layer 110 (which is associated with the database). The calculation engine layer 110 may be based on and/or interact with the other two layers, the logical layer 120 and/or the physical table pool 130. The basis of the physical table pool 130 may include physical tables (called indexes) containing the data, which may be stored on one more database servers 140. Various tables 131-134 may be joined using logical metamodels 121-124 defined by the logical layer 120 to form an index. For example, the tables 131-134 in the illustrated $Cube_A$ metamodel 121 (e.g., an online analytical processing or "OLAP" index or other type of data structure) may be assigned roles (e.g., fact or dimension tables) and be joined to form a star schema or other type of schema. It is also possible to form join indexes (e.g., the $Join_B$ metamodel 122 in FIG. 1), which may act like database views in computing environments.

A calculation scenario 150 may include individual nodes 111-114 (e.g., calculation views), which in turn each define operations such as a ranking filter operation, a join operation joining various physical or logical indexes, and other calculation views (e.g., the $CView_4$ node 114 is illustrated as a join of the $CView_2$ node 112 and the $CView_3$ node 113). That is, the input for a calculation node 111-114 may be one or more of a relational operation, a non-relational operation, or another node 111-114. Relational operations generally refer to operations that may be executed by a relational (e.g., SQL) engine. For example, joins, unions, aggregations, and/or the like are considered relational operations. On the other hand, non-relational operations may be operations that are not part of the standard relational engine's programming language (e.g., SQL standard) or may otherwise not be expressed in the programming language. For example, operations that may loop over intermediate results, scripted views/operators, procedural logic, currency conversion, multi-providers, and/or the like are considered non-relational operations.

In a calculation scenario 150 and/or calculation view node 111-114, two different representations may be provided including a pure calculation scenario in which all possible attributes are given and an instantiated model (also referred to herein as "optimized calculation scenario") that contains only the attributes requested in the query (and required for further calculations). Thus, calculation scenarios may be created that may be used for various queries. With such an arrangement, a calculation scenario 150 may be created which may be reused by multiple queries even if such queries do not require every attribute specified by the calculation scenario 150. Similarly, calculation views (e.g., nodes 111-114) may be created so that they may be reused in multiple calculation scenarios including, for example, the calculation scenario 150. This reusability may provide for simplified development of database queries.

Every calculation scenario 150 may be uniquely identifiable by a name (e.g., the calculation scenario 150 may be a database object with a unique identifier or some other indicia). Accordingly, the calculation scenario 150 may be queried in a manner similar to a view in a SQL database. Thus, the query is forwarded to the calculation node 111-114 for the calculation scenario 150 that is marked as the corresponding default node. In addition, a query may be executed on a particular calculation node 111-114 (as specified in the query). Further, nested calculation scenarios may be generated in which one calculation scenario 150 is used as source in another calculation scenario (e.g. via a calculation node 111-114 in this calculation scenario 150). Each calculation node 111-114 may have one or more output tables. One output table may be consumed by several calculation nodes 111-114.

Figure 2:
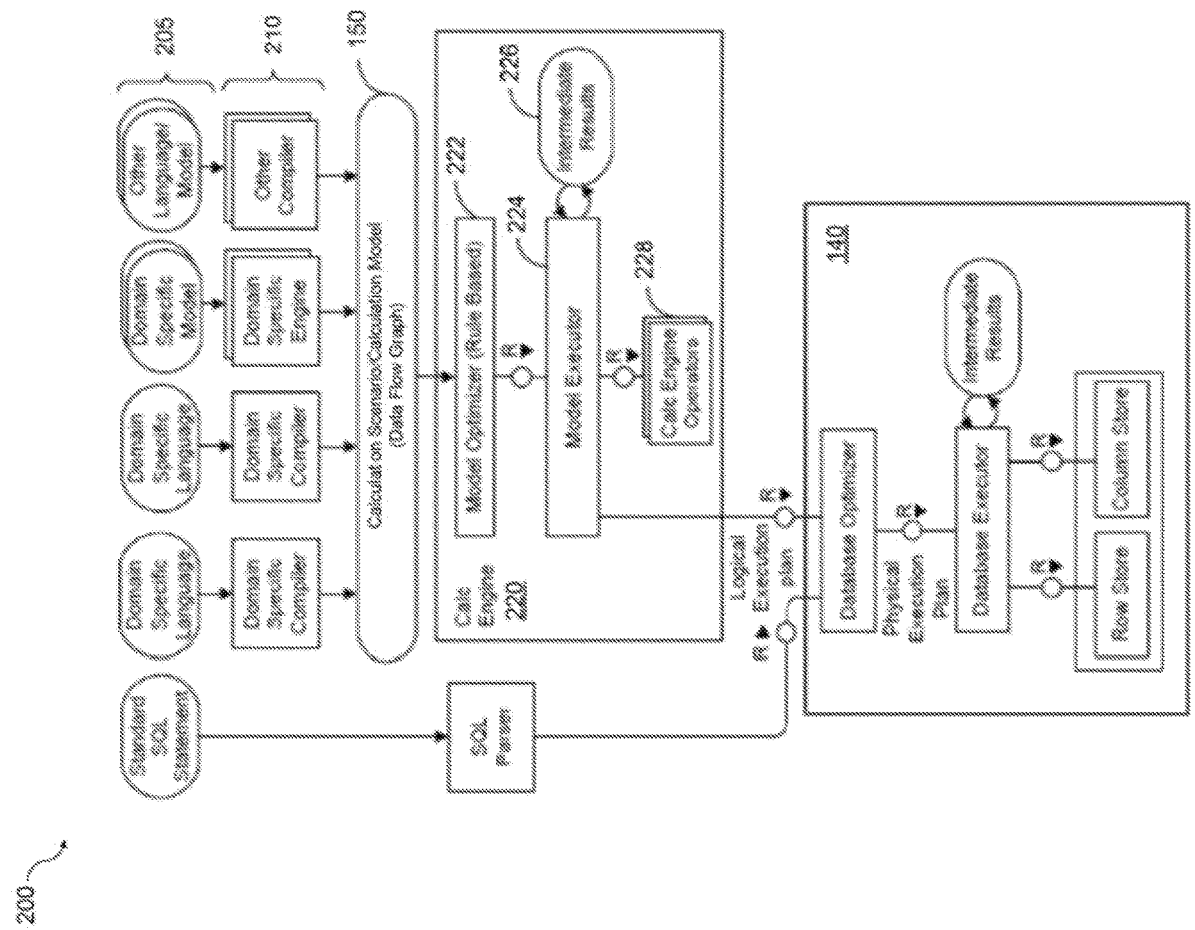
FIG. 2 illustrates an exemplary architecture for request processing and execution control, according to some implementations of the current subject matter.

FIG. 2 illustrates an exemplary architecture 200 for request processing and execution control, according to some implementations of the current subject matter. As shown in FIG. 2, artifacts 205 in different domain specific languages may be translated by their specific compilers 210 into a common representation called the calculation scenario 150 (which may also referred to as a calculation model). To achieve enhanced performance, the models and programs written in these languages may be executed inside the database server 140. This arrangement eliminates the need to transfer large amounts of data between the database server 140 and a client application 137, which may be executed by the application server 135. Once the different artifacts 205 are compiled into this calculation scenario 150, they may be processed and executed in the same manner. For example, a calculation engine 220 may optimize and/or execute the calculation scenario 150. At least a portion of the illustrated architecture 200 may be implemented as a database management system (e.g., not including the artifacts 205).

The calculation scenario 150 may be represented as a directed acyclic graph with arrows representing data flows and nodes that represent operations. Each node includes a set of inputs and outputs and an operation (or optionally multiple operations) that transforms the inputs into the outputs. In addition to their primary operation, each node may also include a filter condition for filtering the result set. The inputs and the outputs of the operations may be table valued parameters (i.e., user-defined table types that are passed into a procedure or function and that provide an efficient way to pass multiple rows of data to a client application 137 at the application server 135). Inputs may be connected to tables or to the outputs of other nodes. The calculation scenario 150 may support a variety of node types such as (i) nodes for set operations such as projection, aggregation, join, union, minus, intersection, and (ii) SQL nodes that execute a SQL statement which is an attribute of the calculation node. In addition, to enable parallel execution, the calculation scenario 150 may contain split and merge operations. A split operation may be used to partition input tables for subsequent processing steps based on partitioning criteria. Operations between the split and merge operation may then be executed in parallel for the different partitions. Parallel execution may also be performed without split and merge operation such that all nodes on one level may be executed in parallel until the next synchronization point. Split and merge allows for enhanced/automatically generated parallelization. If a user knows that the operations between the split and merge may work on portioned data without changing the result, they may use a split. Then, the calculation nodes may be automatically multiplied between split and merge and partition the data.

The calculation scenario 150 may be defined as part of database metadata and invoked multiple times. For example, the calculation scenario 150 may be created by a SQL statement "CREATE CALCULATION SCENARIO <NAME> USING <XML or JSON>". Once the calculation scenario 150 is created, it may be queried (e.g., "SELECT A, B, C FROM <scenario name>", etc.). In some cases, the calculation scenario 150 may be pre-defined (e.g., defaults, those previously defined by users, etc.). The predefined calculation scenario 150 may be persisted in a repository (coupled to the database server 140) or in transient scenarios. The predefined calculation scenario 150 may also be kept in-memory.

The calculation scenario 150 may be considered more powerful than traditional SQL queries or SQL views for many reasons. One reason is the possibility to define parameterized calculation schemas that are specialized when the actual query is issued. Unlike a SQL view, the calculation scenario 150 does not necessarily describe the actual query to be executed. Rather, it may describe the structure of the calculation. Further information may be supplied when the calculation scenario is executed. This further information may include parameters that represent values (for example in filter conditions). To provide additional flexibility, the operations may optionally also be refined upon invoking the calculation model. For example, at definition time, the calculation scenario 150 may contain an aggregation node containing all attributes. Later, the attributes for grouping may be supplied with the query. This allows having a predefined generic aggregation, with the actual aggregation dimensions supplied at invocation time. The calculation engine 220 may use the actual parameters, attribute list, grouping attributes, and the like supplied with the invocation to instantiate a query specific calculation scenario 150. This instantiated calculation scenario 150 is optimized for the actual query and does not contain attributes, nodes or data flows that are not needed for the specific invocation. For example, as described herein, the calculation scenario 150 may comprise a hierarchical join, which may be optimized by the calculation engine 220 prior to execution.

When the calculation engine 220 gets a request to execute the calculation scenario 150, it may first optimize the calculation scenario 150 using a rule based model optimizer 222. Examples for optimizations performed by the model optimizer 222 may include "push down" filters and projections so that intermediate results 226 are narrowed down earlier in compilation or execution, or the combination of multiple aggregation and join operations into one node. The optimized model may then be executed by a calculation engine model executor 224 (a similar or the same model executor may be used by the database directly in some cases). This may include decisions about parallel execution of operations in the calculation scenario 150. The model executor 224 may invoke the required operations (using, for example, a calculation engine operators module 228) and manage intermediate results 226. At least some of the calculation nodes and the corresponding operations may be executed directly in the calculation engine 220 (e.g., creating the union of several intermediate results 226). The remaining nodes of the calculation scenario 150 (not implemented in the calculation engine 220) may be transformed by the model executor 224 into a set of logical database execution plans. Multiple set operation nodes and the corresponding operations may be combined into one logical database execution plan if possible.

The model optimizer 222 may be configured to enable dynamic partitioning based on one or more aspects of a query and/or datasets used by queries. The model optimizer may implement a series of rules that are triggered based on attributes of incoming datasets exceeding specified thresholds. Such rules may, for example, apply thresholds each with a corresponding a parallelization factor. For example, if the incoming dataset has 1 million rows then two partitions (e.g., parallel jobs, etc.) may be implemented, or if the incoming dataset has five million rows then five partitions (e.g., parallel jobs, etc.) may be implemented, and the like.

The attributes of the incoming datasets utilized by the rules of model optimizer 222 may additionally or alternatively be based on an estimated and/or actual amount of memory consumed by the dataset, a number of rows and/or columns in the dataset, and the number of cell values for the dataset, and the like.

The calculation scenario 150 may include a type of node referred to herein as a semantic node (or sometimes semantic root node). In some aspects, a database modeler may flag the root node (output) in a graphical calculation view to which the queries of the database applications are directed as semantic node. This arrangement allows the calculation engine 220 to easily identify those queries and to thereby provide a proper handling of the query in all cases.

The calculation scenario 150 used by the calculation engine 220 may be exposed as a special type of database view called a graphical calculation view. For example, relational (e.g., SQL) views may be stacked on top of the calculation scenario 150. Stacking in this manner may allow for a user to customize the front end of a program which utilizes the calculation scenario 150. A calculation view may be used in SQL queries and may be combined with tables and standard views using joins and sub queries. When such a query is executed, the database executor inside the SQL processor (not shown) needs to invoke the calculation engine 220 to execute the calculation scenario 150 behind the calculation view. In some implementations, the calculation engine 220 and the SQL processor are calling each other: on one hand the calculation engine 220 invokes the SQL processor for executing set operations and SQL nodes and, on the other hand, the SQL processor invokes the calculation engine 220 when executing SQL queries with calculation views.

In some implementations, a query may be received by a database server from a remote application server that is associated with a calculation scenario that defines a data flow model including one or more calculation nodes. The calculation nodes may include a top operator node that may specify a plurality of attributes. The query may also request a subset of the attributes specified by the top operator node, where the database server may instantiate an optimized calculation scenario which may request only the subset of attributes. The operations defined by the calculation nodes of the instantiated calculation scenario may be executed to generate a responsive data set that may be provided to the application server by the database server.

In some implementations, a top operator may be parameterized by setting a number of lines that should be returned and defining a number of base attributes with a sort direction. The sort may be performed and the number of defined lines may be returned. Further, a special top attribute may be defined to allow obtaining a top number of lines for each group for this attribute. In order to calculate the top operator, the base attributes may be static (e.g., similar to join attributes for a join operator). If a static top operator specifies two base attributes, they may be requested independently from the attributes that may be requested by the query.

Dynamic top operators may specify a superset of base attributes on the top operator and to flag the top operator node for dynamic behavior. This flag may be evaluated by the instantiation process of the calculation engine 220 (as shown in FIG. 2). The instantiation process may remove all base attributes on the top operator that are not requested by the query and dynamic top operator results may be generated. A top operator may act in a dynamic fashion if the query specifies same (e.g., via a flag, etc.). The flag may be evaluated in the instantiation process for the calculation scenario 150 (as shown in FIG. 1) and the dynamic operation may reduce the number of base attributes of the top operator. An error may be returned of no base attribute is requested in the end.

In some implementations, calculation engine 220 may include a top operation that may be defined, among other properties, by one or more partition attributes, where a top computation may be performed individually for each partition. The use usage of partition attributes may be dependent on attributes that may be requested in the query, which may affect results of the query while improving performance. In some implementations, a ranking filter operation may represent a generalization of the top operation in which arbitrary functions may be used in addition, or alternatively, to more general filters.

In some implementations, the calculation scenario may be include a ranking filter operation, which may be configured to implement dynamic ordering and/or dynamic partitioning processes discussed above. The ranking filter operation may be executed by the calculation engine 220, as part of the execution of a query that invokes the calculation scenario 150. This operation may be executed on a partition of a database table such as, for example, one or more of the tables 131-134 included in the physical table pool 130 shown in FIG. 1. The ranking filter operation may be an aggregation operation and a filter operation that the calculation engine 220 performs together, for example, one after another. The ranking filter operation may be performed to generate a result corresponding to at least a portion of the rows included the partition.

In some implementations, the result of the ranking filter operation may correspond to at least some of the rows included in the partition of the database table that have one or more attributes including, for example, a row number, a rank, and/or the like. For example, the ranking filter operation may be configured to generate a result including a top n quantity or a top n percentage of rows from the partition. That is, the result of the ranking filter may include rows whose row number does not exceed the value n or are in the top n percent of row numbers. Alternatively and/or additionally, the result of the ranking filter operation may include rows from the partition having a top n rank or a top n percentage rank. The result of the ranking filter operation may also include an aggregate (e.g., a sum, an average, a minimum, a maximum, a medium, a count, a mode, a range, and/or the like) of the values occupying a top n quantity or a top n percentage of rows from the partition.

In some implementations, the ranking filter operation may be defined to include one or more properties including, for example, function, partition attributes, order attributes, and filter definition. For example, the ranking filter operation may be defined as part of the calculation scenario 150. The definition of the calculation scenario 150 may include a definition of the ranking filter operation. The ranking filter operation may be defined to support a variety of functions including, for example, ROW_NUMBER, RANK, DENSE_RANK, SUM, ROW_NUMBER_PERCENT, RANK_PERCENT, DENSE_RANK_PERCENT, SUM_PERCENT, MIN, MAX, FIRST, LAST, NTH_VALUE, MEDIAN, AVG and/or the like. The type of function that is applied during the performance of the ranking filter operation may be specified by the query invoking the calculation scenario 150. The query may specify the partition attributes, which may include one or more names of the columns from a database table forming a first partition operated upon by the ranking filter operation. Further, the query may specify the order attributes indicating, for each column included in the first partition, whether the rows are organized in an ascending order or a descending order.

In some implementations, the filter definition included in the definition of the ranking filter operation may define the filter that is applied to the data included in the first partition. For example, the filter definition may include an offset, a quantity, and an offset reference. The offset included in the filter definition may indicate where (e.g., a row number or a quantity of rows) in the first partition of the database table to begin applying the filter. Meanwhile, the offset reference may indicate whether the offset should be determined from a start (e.g., a first row) of the first partition and/or an end (e.g., a last row) of the first partition. The quantity included in the filter definition may indicate a quantity of rows in the first partition to which to apply the filter.

In some implementations, the calculation engine 220 may apply the ranking filter operation to the first partition of the database table. If, for example, the ranking filter operation is defined to apply the ROW_NUMBER function, the calculation engine 220 performing the ranking filter operation may generate a result that includes a top n quantity of rows from the first partition, which may correspond to rows having a row number that does not exceed the value n.

Figure 4:
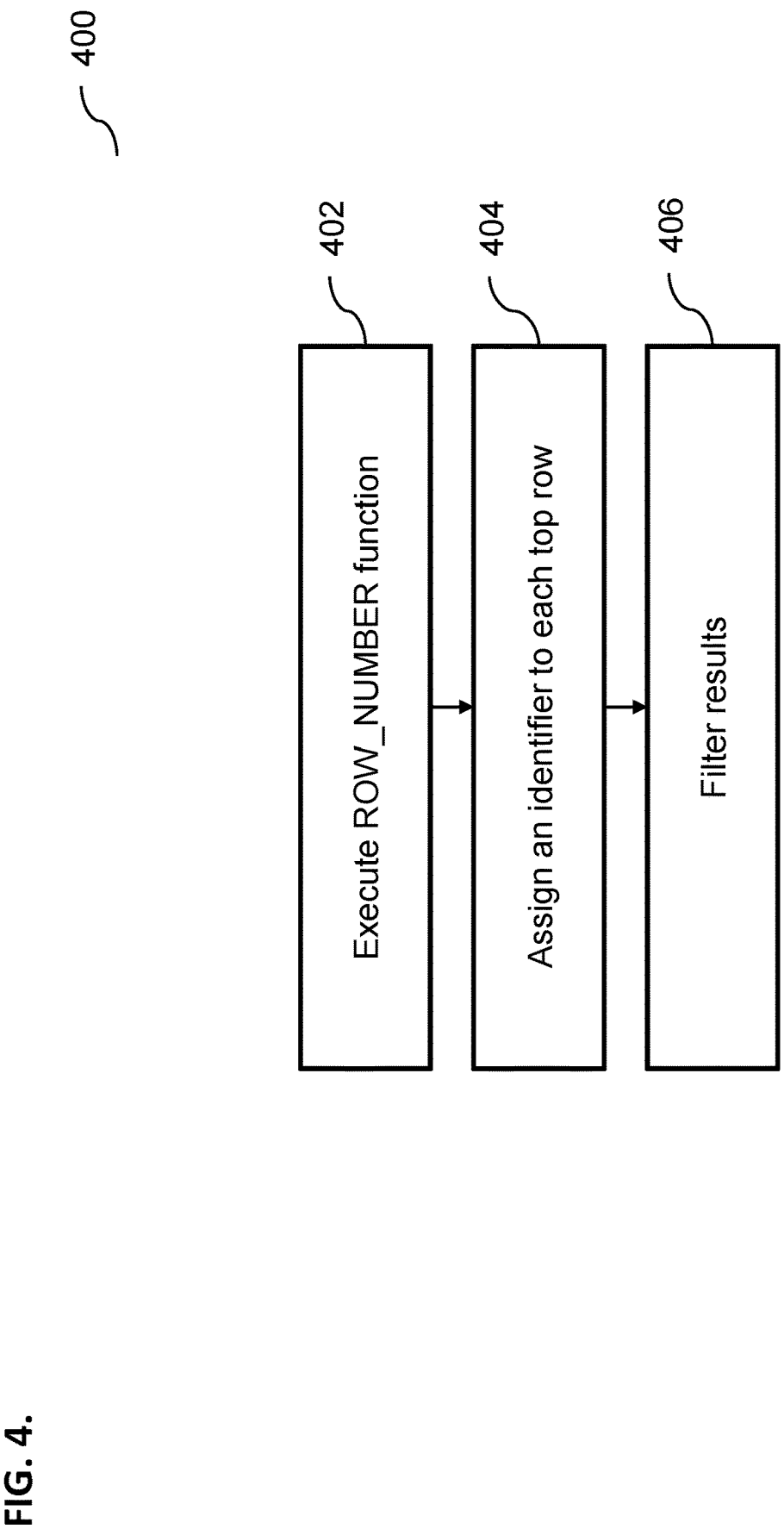
FIG. 4 illustrates an exemplary process for executing a filter ranking function as part of a calculation scenario, according to some implementations of the current subject matter.

FIG. 4 illustrates an exemplary process 400 for executing a filter ranking function as part of a calculation scenario (e.g., calculation scenario 150), according to some implementations of the current subject matter. The process 400 may be performed by the calculation engine 220, discussed above. By way of a non-limiting, illustration-only, example, the process 400 may be performed in connection with a ROW_NUMBER filter ranking, whereby first or top n rows in a partition are being requested. As can be understood, any other functions may be performed in a similar fashion.

Referring back to FIG. 4, at 402, execution of the ROW_NUMBER function may be initiated. The ranking filter process 400 may be applied to an exemplary database table 300 shown in FIG. 3a. The table 300 may include one or more numbered rows, as identified by row numbers (e.g., 1, 2, 3, 1, 2, 1, 2). One or more combinations of rows may correspond to one or more partitions (e.g., rows numbered 1, 2, 3 may correspond to a single partition). The database table 300 may be configured to include one or more ordering columns ($O_1$, $O_2$) and one or more partitioning columns ($P_1$, $P_2$). The ordering columns may include data that may have been ordered using one or more ordering attributes. The partitioning columns may include data that may have been partitioned using one or more partitioning attributes. The data included in the table 300 may be configured ordered and/or partitioned for the purposes of performing one or more filtering algorithms, as described herein, e.g., ranking filter algorithm 400 shown in FIG. 4.

At 404, as a result of the execution of this ROW_NUMBER function, rows shown in the database table 300 may be configured to be sorted and generating a columns containing assigned row numbers and/or any other identifiers (in accordance with the ROW_NUMBER function). The process 400 may then be completed with application of a filtering function to the table 300 shown in FIG. 3a, at 406. To apply filtering, the calculation engine 220 may be configured to perform another "pass" over the table 300 to obtain desired results.

In some implementations, execution of the ROW_NUMBER function may be implemented by executing ordering of the rows after application of order attributes and partition attributes to the data in the database table 300 shown in FIG. 3a. All database table 300 partitions may be configured to form connected blocks, whereby inside each block, data may be sorted by the order attributes, so that each row inside a partition-by block may be numbered, as shown in FIG. 3a. In some implementations, the process 400 may be configured to be performed by combining generation of a ROW_NUM column (as shown in FIG. 3a) with filtering into a single operation, where the filtering information may be used to store the first n rows for the output in each partition. This may shorten the processing time, whereby only a single filtering operation may be performed, however, this process may still require that for each partitioning attribute and ordering attribute, data sorting may need to be performed.

Figure 5A:
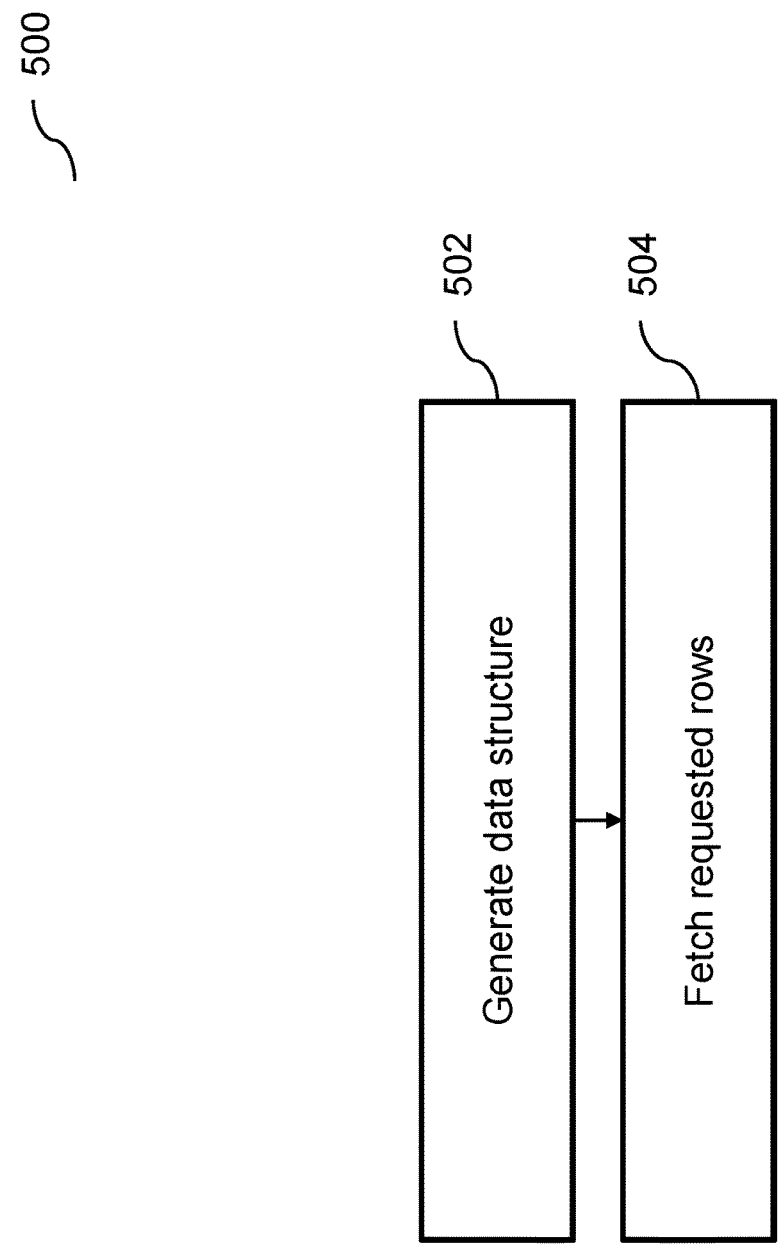
FIG. 5a illustrates an exemplary process for executing a filter ranking function as part of a calculation scenario, according to some implementations of the current subject matter.

FIG. 5a illustrates an exemplary process 500 for executing a filter ranking function as part of a calculation scenario (e.g., calculation scenario 150), according to some implementations of the current subject matter. Similarly, the process 500 may be performed by the calculation engine 220, discussed above. The process 500 does not require sorting that may be part of the process 400 shown in FIG. 4. In some implementations, table 310 shown in FIG. 3b may be used as an input to the process 500. As shown in FIG. 3b, similar to the table 300, the database table 310 may be configured to include one or more ordering columns ($O_1$, $O_2$) and one or more partitioning columns ($P_1$, $P_2$). The ordering columns may include data that may have been ordered using one or more ordering attributes. The partitioning columns may include data that may have been partitioned using one or more partitioning attributes. The process 500 may be configured to use table 310 to generate a data structure that may be used for the purposes of filtering data and obtaining results, when a calculation scenario (e.g., calculation scenario 220) is executed, as will be discussed below At 502, a data structure that may be configured to store all relevant rows from one or more partitions of the database table (e.g., table 310 shown in FIG. 3b) that may be responsive to a query, may be generated. The data structure may be generated by using a std::map functionality. Hence, the generated data structure may be configured to include a map, which may be configured to include an entry for each partition that have already been used/"seen" while the calculation engine (e.g., calculation engine 150) passes over the database table (e.g., table 310 shown in FIG. 3b). Each partition in the map may be configured to map to another data structure that may store one or more potentially relevant rows for that partition. In this case, a std::set functionality may be implemented. This functionality may be configured to store its entries in a search tree using the ordering attributes, where each entry may correspond to a row in the database table.

By way of a non-limiting example, assuming table 310 shown in FIG. 3b as an input and top 1 row in each partition of the table 310 is desired to be obtained, the process 500 may be configured to process each row in the table 310 and update the generated data structure accordingly after process of each row.

In particular, as shown in FIG. 3b, in the first row, the partition attributes (shown in partitioning columns ($P_1$, $P_2$)) are (A, B). Then, in the mapping structure, 1 may be added to the image of (A, B), i.e., (A, B) {1}. The second row in the table 310 may belong to the same partition, and hence, 2 may be added to the image of (A, B) in the mapping structure, i.e., (A, B) {1, 2}. Because the desired result is obtaining the top one rows for each partition, {1, 2} may be too "large". "Large" may be addressing the row which appears subsequently in accordance with the ordering attributes (i.e., ($O_1$, $O_2$)). Thus, the larger row may be deleted. As shown in FIG. 3b, the first row's ordering attributes are (2, 1), which is smaller than the second row's ordering attributes (2, 2). As such, in the mapping structure, 2 may be deleted from the image of (A, B), i.e., (A, B)→{1}. By continuing in the same fashion, the following may be obtained:

Row 1: (A, B)→{1};
Row 2: (A, B)→{1};
Row 3: (A, B)→{1} and (B, B)→{3};
Row 4: (A, B)→{1} and (B, B)→{3} and (B, A)→{4};
Row 5: (A, B)→{1} and (B, B)→{5} and (B, A)→{4};
Row 6: (A, B)→{1} and (B, B)→{5} and (B, A)→{4};
Row 7: (A, B)→{1} and (B, B)→{5} and (B, A)→{4}.

The final result of the process may include rows 1, 4, and 5, and an added column is 1 for all three rows, because all rows are correspond to the first row in their respective partitions.

Figure 5B:
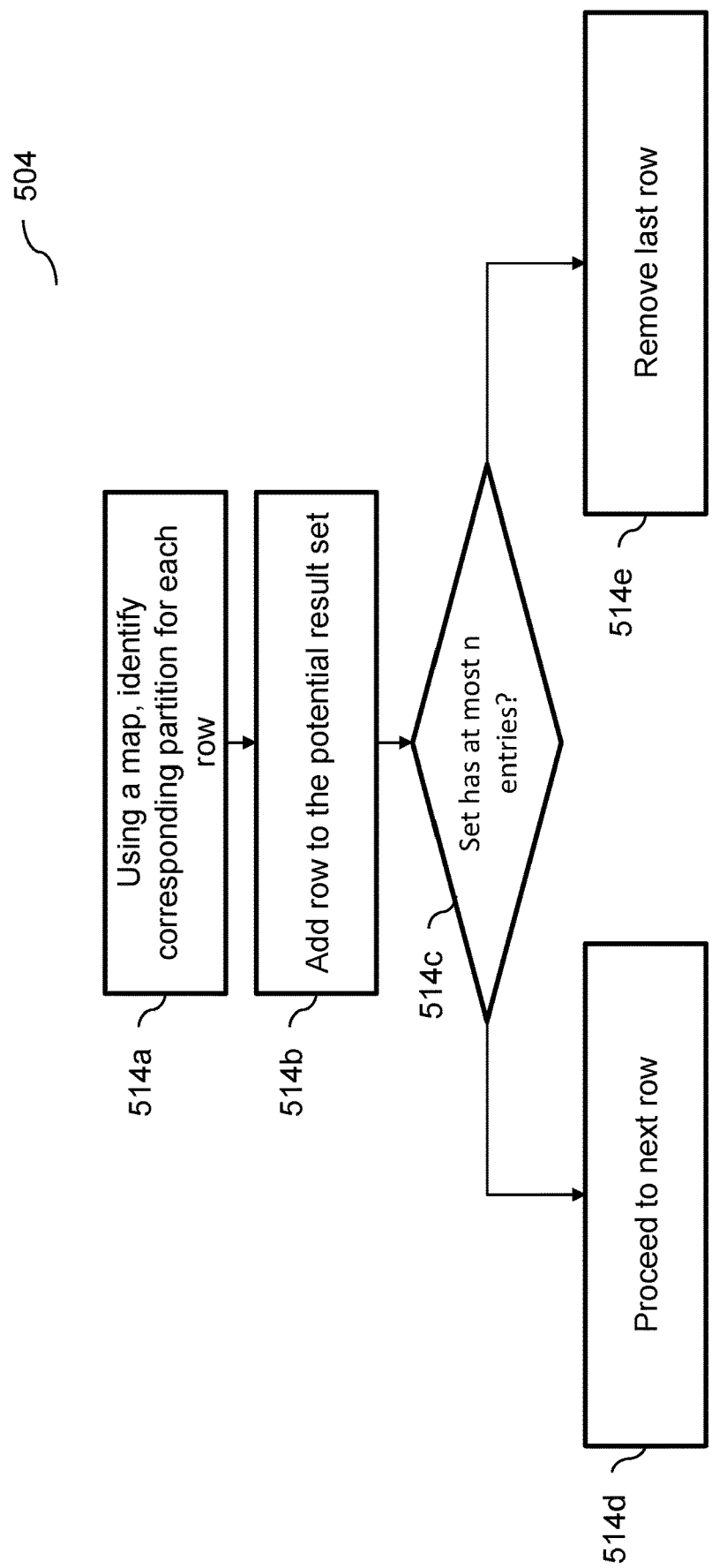
FIG. 5b illustrates further details of the result fetching operation shown in FIG. 5a, according to some implementations of the current subject matter.

At 504, all relevant rows may be fetched by the calculation engine 220. This may require only a single "pass" over the table by the calculation engine 220. FIG. 5b illustrates further details of the result fetching operation 504.

As shown in FIG. 5b, at 514a, while passing over the table, the calculation engine 220 may be configured to determine or identify which partition each row may belong to. The calculation engine 220 may be configured to use the above generated map (e.g., using std::map functionality) for the purposes of this determination.

At 514*b*, the calculation engine 220 may be configured to add each identified row to a potential result set. At 514*c*, the calculation engine 220 may be configured to determine whether the potential result set has at most n number of entries (where n may be a predetermined number). If so, the calculation engine may be configured to pass over the next row in the database table, at 514*d*. Otherwise, e.g., the engine 220 determines that the generated potential result set exceeds n number of entries, the last row in the potential result set may be removed, at 514*e*. When the pass through the entire database table is finished, all identified rows may be stored in the generated data structure and hence, may make up the result set, at 504, as shown in FIG. 5*a*.

In some implementations, the process 500 may be performed in a recursive way. This may be accomplished by splitting a database table into parts (e.g., halves) and processing each part in a parallel fashion in accordance with the operations shown in FIGS. 5*a-b*. When process of each part is completed, separate data structures storing potential data results may be generated. The potential data results from each part may be combined, e.g. by inserting all stored rows of data structure from one part into the data structure of the other part.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 6:
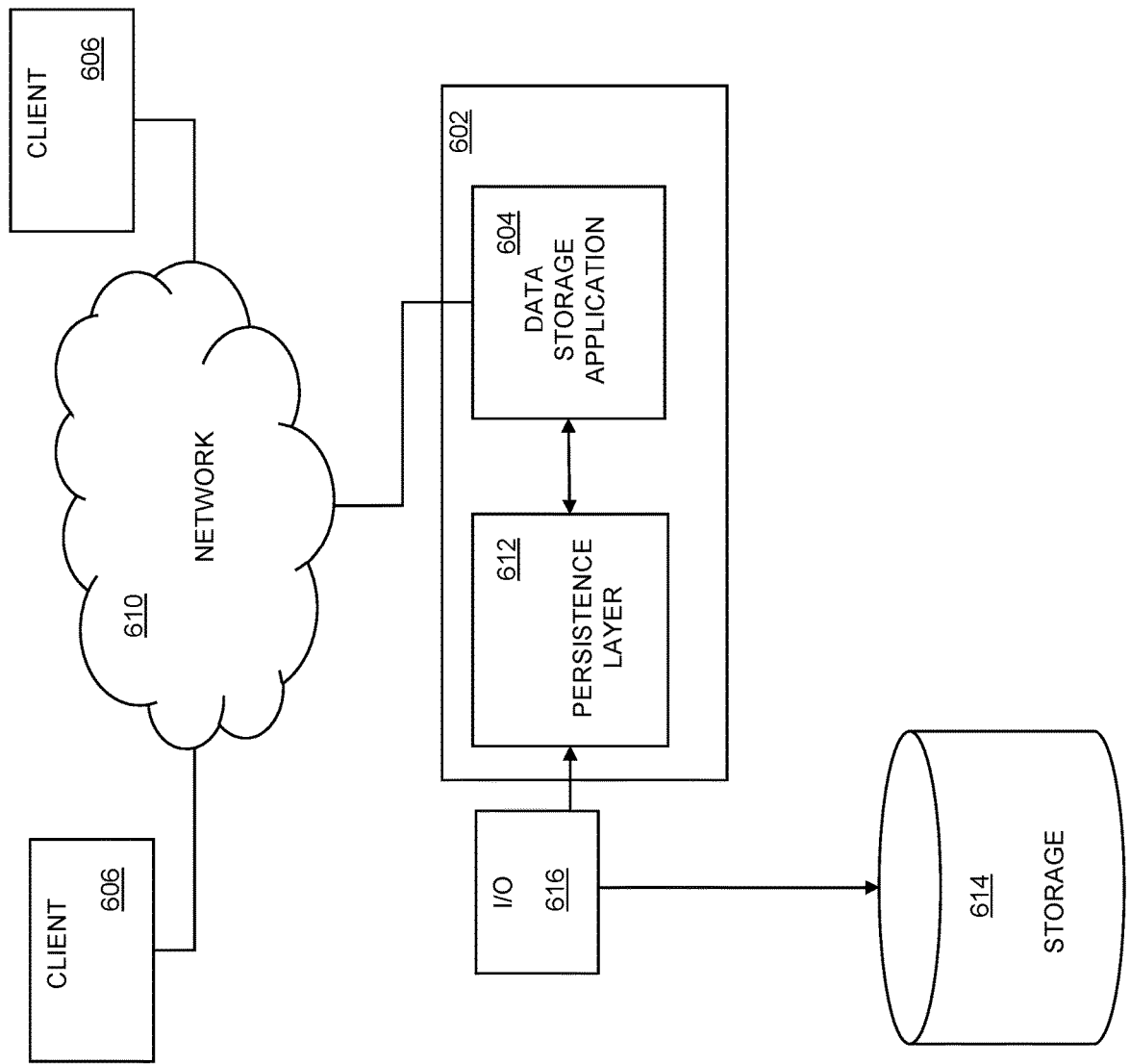
FIG. 6 is a diagram illustrating an exemplary system including a data storage application, according to some implementations of the current subject matter.

FIG. 6 illustrates an exemplary system 600 in which a computing system 602, which may include one or more programmable processors that may be collocated, linked over one or more networks, etc., executes one or more modules, software components, or the like of a data storage application 604, according to some implementations of the current subject matter. The data storage application 604 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 602 as well as to remote users accessing the computing system 602 from one or more client machines 606 over a network connection 610. One or more user interface screens produced by the one or more first modules may be displayed to a user, either via a local display or via a display associated with one of the client machines 606. Data units of the data storage application 604 may be transiently stored in a persistence layer 612 (e.g., a page buffer or other type of temporary persistency layer), which may write the data, in the form of storage pages, to one or more storages 614, for example via an input/output component 616. The one or more storages 614 may include one or more physical storage media or devices (e.g. hard disk drives, persistent flash memory, random access memory, optical media, magnetic media, and the like) configured for writing data for longer term storage. It should be noted that the storage 614 and the input/output component 616 may be included in the computing system 602 despite their being shown as external to the computing system 602 in FIG. 6.

Data retained at the longer term storage 614 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 7:
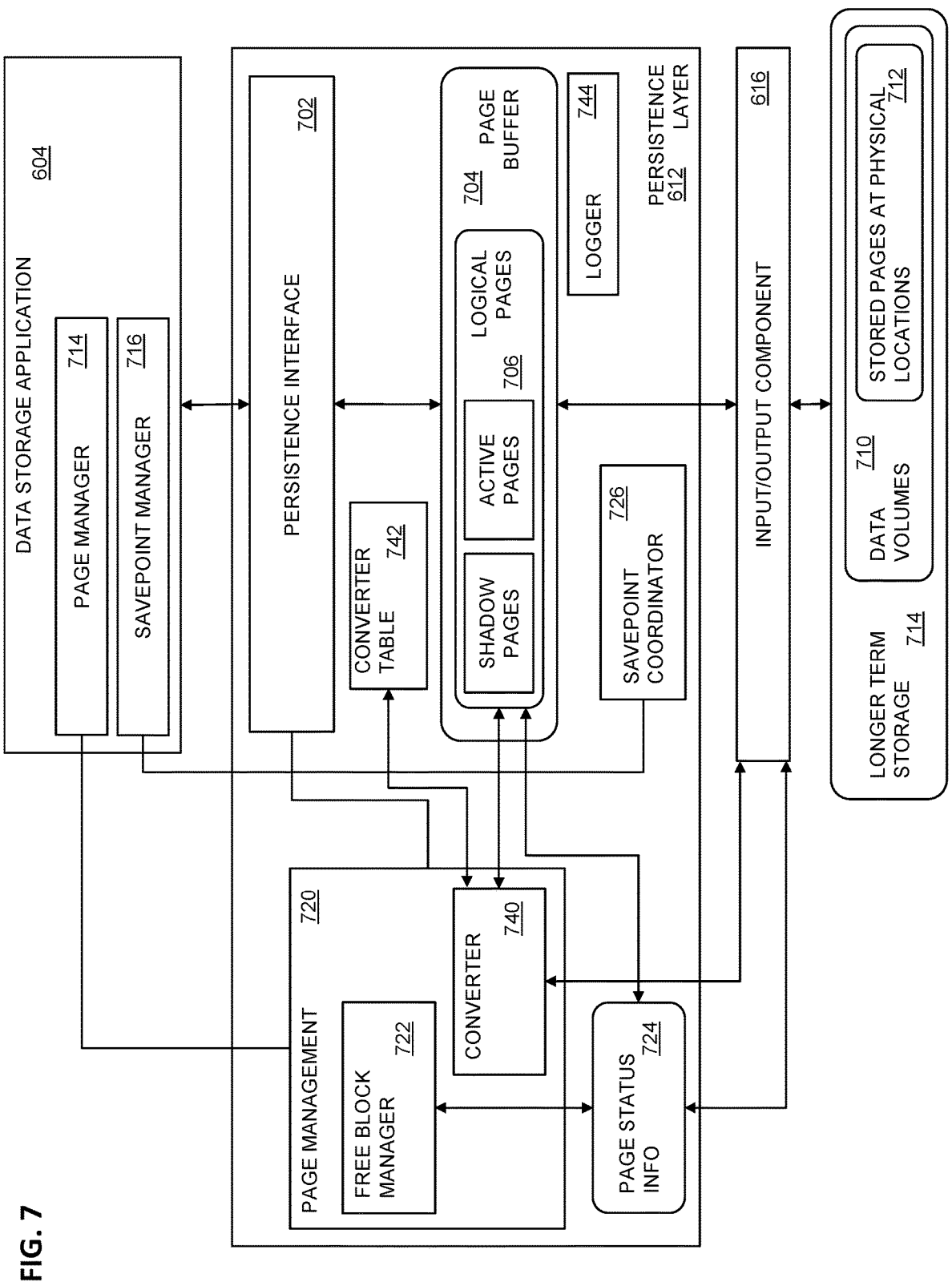
FIG. 7 is a diagram illustrating details of the system of FIG. 6.

FIG. 7 illustrates exemplary software architecture 700, according to some implementations of the current subject matter. A data storage application 604, which may be implemented in one or more of hardware and software, may include one or more of a database application, a network-attached storage system, or the like. According to at least some implementations of the current subject matter, such a data storage application 604 may include or otherwise interface with a persistence layer 612 or other type of memory buffer, for example via a persistence interface 702. A page buffer 704 within the persistence layer 612 may store one or more logical pages 706, and optionally may include shadow pages, active pages, and the like. The logical pages 706 retained in the persistence layer 612 may be written to a storage (e.g. a longer term storage, etc.) 614 via an input/output component 616, which may be a software module, a sub-system implemented in one or more of software and hardware, or the like. The storage 614 may include one or more data volumes 710 where stored pages 712 are allocated at physical memory blocks.

In some implementations, the data storage application 604 may include or be otherwise in communication with a page manager 714 and/or a savepoint manager 716. The page manager 714 may communicate with a page management module 720 at the persistence layer 612 that may include a free block manager 722 that monitors page status information 724, for example the status of physical pages within the storage 614 and logical pages in the persistence layer 612 (and optionally in the page buffer 704). The savepoint manager 716 may communicate with a savepoint coordinator 726 at the persistence layer 612 to handle savepoints, which are used to create a consistent persistent state of the database for restart after a possible crash.

In some implementations of a data storage application 604, the page management module of the persistence layer 612 may implement a shadow paging. The free block manager 722 within the page management module 720 may maintain the status of physical pages. The page buffer 704 may include a fixed page status buffer that operates as discussed herein. A converter component 740, which may be part of or in communication with the page management module 720, may be responsible for mapping between logical and physical pages written to the storage 614. The converter 740 may maintain the current mapping of logical pages to the corresponding physical pages in a converter table 742. The converter 740 may maintain a current mapping of logical pages 706 to the corresponding physical pages in one or more converter tables 742. When a logical page 706 is read from storage 614, the storage page to be loaded may be looked up from the one or more converter tables 742 using the converter 740. When a logical page is written to storage 614 the first time after a savepoint, a new free physical page is assigned to the logical page. The free block manager 722 marks the new physical page as "used" and the new mapping is stored in the one or more converter tables 742.

The persistence layer 612 may ensure that changes made in the data storage application 604 are durable and that the data storage application 604 may be restored to a most recent committed state after a restart. Writing data to the storage 614 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 744 may also be included to store the changes made to the data of the data storage application in a linear log. The logger component 744 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 744 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 612 may use a combination of undo log entries (from one or more logs) and shadow paging.

The persistence interface 702 may handle read and write requests of stores (e.g., in-memory stores, etc.). The persistence interface 702 may also provide write methods for writing data both with logging and without logging. If the logged write operations are used, the persistence interface 702 invokes the logger 744. In addition, the logger 744 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 744. For an entry of type "update", for example, this would be the identification of the affected record and the after image of the modified data.

When the data application 604 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 744 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 744 may write a database log (or simply referred to herein as a "log") sequentially into a memory buffer in natural order (e.g., sequential order, etc.). If several physical hard disks/storage devices are used to store log data, several log partitions may be defined. Thereafter, the logger 744 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 604 may use shadow paging so that the savepoint manager 716 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 8:
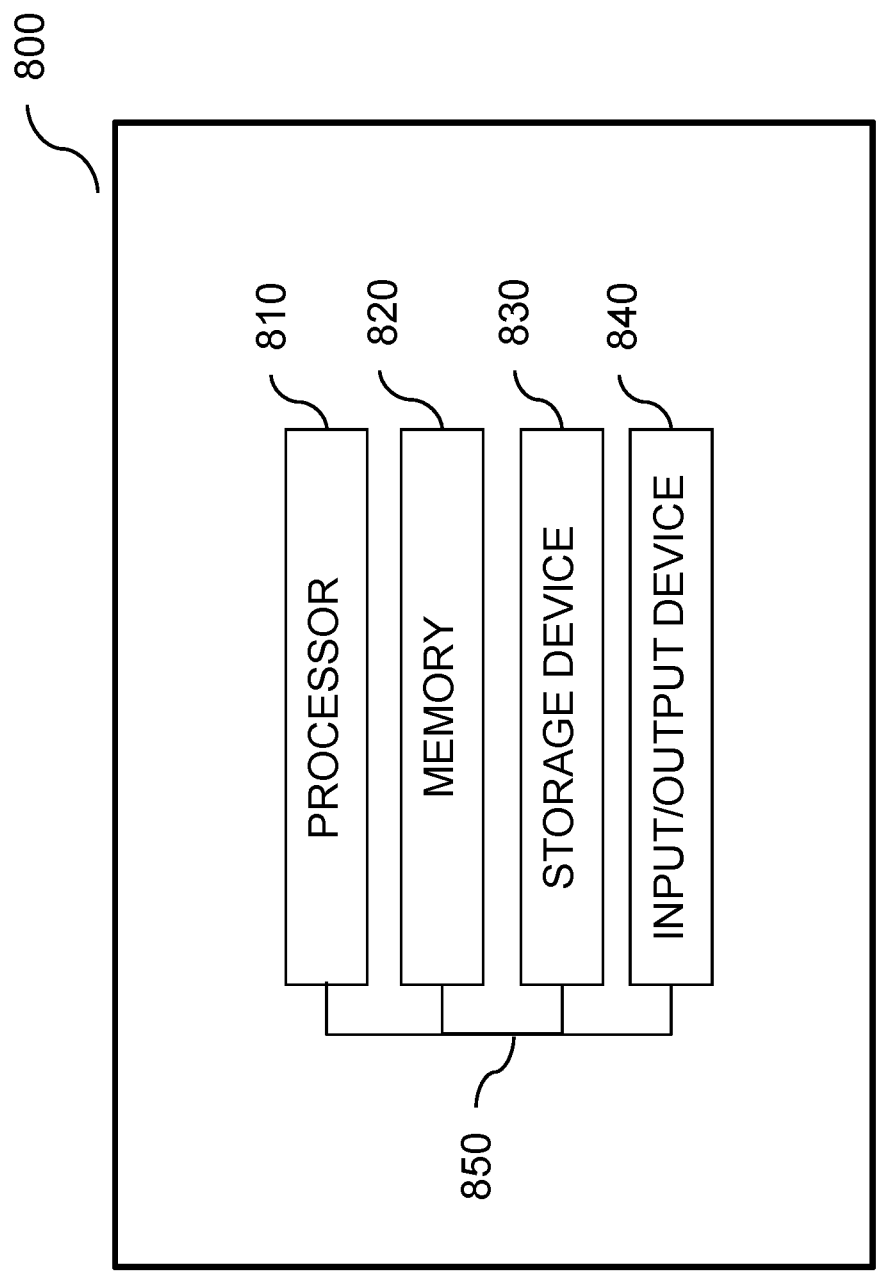
FIG. 8 is an exemplary system, according to some implementations of the current subject matter.

In some implementations, the current subject matter may be configured to be implemented in a system 800, as shown in FIG. 8. The system 800 may include a processor 810, a memory 820, a storage device 830, and an input/output device 840. Each of the components 810, 820, 830 and 840 may be interconnected using a system bus 850. The processor 810 may be configured to process instructions for execution within the system 800. In some implementations, the processor 810 may be a single-threaded processor. In alternate implementations, the processor 810 may be a multi-threaded processor. The processor 810 may be further configured to process instructions stored in the memory 820 or on the storage device 830, including receiving or sending information through the input/output device 840. The memory 820 may store information within the system 800. In some implementations, the memory 820 may be a computer-readable medium. In alternate implementations, the memory 820 may be a volatile memory unit. In yet some implementations, the memory 820 may be a non-volatile memory unit. The storage device 830 may be capable of providing mass storage for the system 800. In some implementations, the storage device 830 may be a computer-readable medium. In alternate implementations, the storage device 830 may be a floppy disk device, a hard disk device, an optical disk device, a tape device, non-volatile solid state memory, or any other type of storage device. The input/output device 840 may be configured to provide input/output operations for the system 800. In some implementations, the input/output device 840 may include a keyboard and/or pointing device. In alternate implementations, the input/output device 840 may include a display unit for displaying graphical user interfaces.

FIG. 9 illustrates an exemplary method 900 for executing a query, according to some implementations of the current subject matter. At 902, a database server (e.g., a database server 140) may be configured to receive a query from an application server (e.g., application server 135). The query may be associated with a calculation scenario (e.g., calculation scenario 150) that may define a data flow model that may include one or more calculation nodes. Each calculation node may be configured to correspond to an operation being performed on one or more database tables stored at a database. The calculation nodes may include a first calculation node that may specify a filter ranking operation (e.g., as discussed above in connection with FIGS. 3a-5b).

At, 904, the calculation engine 220 may execute the calculation scenario. The execution may include performing the ranking filter operation to generate a data structure (e.g., as discussed in connection with FIGS. 5a-b) that may store a plurality of rows of the database tables At 906, based on the execution of the calculation scenario, a result data set including at least one row from the plurality of rows may be generated. The result data set may also be provided by the database server to the application server.

In some implementations, the current subject matter may include one or more of the following optional features. The generated data structure may include a mapping of each row in the plurality of rows to one or more partitions of the one or more database tables processed by the calculation engine during execution of the calculation scenario. Further, the generating may further include selecting the at least one row in the result data set from the plurality of rows based on the mapping.

In some implementations, at least one partition in the mapping may be configured to map to another data structure storing one or more rows for inclusion in the result data set. The result set may include a predetermined number of rows. The rows in the other data structure may be selected based on one or more ordering attributes defining a predetermined order of execution of operations of the received query on the partitions of the database tables.

In some implementations, the generating may include splitting the one or more database tables into one or more parts, generating, for each one or more parts, a partial result data set in a plurality of partial result data sets, each partial result data set, and combining the plurality of generated partial result data sets in the result data set.

In some implementations, the calculation engine may invoke an SQL processor for executing set operations. Further, an input for each calculation node may include one or more of: a physical index, a join index, an OLAP index, and another calculation node. Each calculation node may have at least one output table that is used to generate the data set. At least one calculation node may consume an output table of another calculation node. The database may be a column-oriented in-memory database.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving, by a database server from an application server, a query associated with a calculation scenario defining a data flow model that comprises one or more calculation nodes, each of the one or more calculation nodes corresponding to an operation being performed on one or more database tables stored at a database, the one or more calculation nodes comprising a first calculation node corresponding to a ranking filter operation;
executing, by a calculation engine, the calculation scenario by performing the ranking filter operation to generate a data structure storing a plurality of rows of the one or more database tables responsive to the query, wherein the data structure comprises a mapping of each row in the plurality of rows to partitions of the one or more database tables processed by the calculation engine during execution of the calculation scenario including the ranking filter operation, wherein the ranking filter operation comprises an aggregation operation and a filter operation being performed together and configured to implement dynamic ordering and partitioning;
generating, based on the executing of the calculation scenario and using the data structure, a result data set comprising at least one row from the plurality of rows, wherein generating the result data set comprises:
splitting the one or more database tables into parts,
generating, for each of the parts, separate data structures storing partial data results, and
combining the partial data results from each of the parts,
detecting, by a persistence layer, a restart of the application server associated with a crash of a network-attached storage system of the application server;
determining a portion of the result data set associated with unfinished transactions; and
providing, by the database server to the application server, the result data set excluding the portion of the result data set associated with the unfinished transactions that are identified using log buffers reordered from inconsecutive log segments of the partitions during a recovery process executed after the crash of the network-attached storage system of the application server.

2. The computer-implemented method of claim 1, wherein generating further comprises selecting the at least one row in the result data set from the plurality of rows based on the mapping.

3. The computer-implemented method of claim 2, wherein at least one partition in the partitions in the mapping is configured to map to another data structure storing one or more rows for inclusion in the result data set.

4. The computer-implemented method of claim 3, wherein the result data set comprises a predetermined number of rows.

5. The computer-implemented method of claim 3, wherein the one or more rows in the another data structure are selected based on one or more ordering attributes defining a predetermined order of execution of operations of the received query on the partitions of the one or more database tables.

6. The computer-implemented method of claim 1, wherein the calculation engine invokes an SQL processor for executing set operations.

7. The computer-implemented method of claim 1, wherein an input for each calculation node comprises one or more of: a physical index, a join index, an OLAP index, and another calculation node.

8. The computer-implemented method of claim 7, wherein each calculation node has at least one output table that is used to generate the result data set.

9. The computer-implemented method of claim 8, wherein at least one calculation node consumes an output table of another calculation node.

10. The computer-implemented method of claim 1, wherein the database is a column-oriented in-memory database.

11. A system comprising:
at least one programmable processor; and
a non-transitory machine-readable medium storing instructions that, when executed by the at least one programmable processor, cause the at least one programmable processor to perform operations comprising:
receiving, by a database server from an application server, a query associated with a calculation scenario defining a data flow model that comprises one or more calculation nodes, each of the one or more calculation nodes corresponding to an operation being performed on one or more database tables stored at a database, the one or more calculation nodes comprising a first calculation node corresponding to a ranking filter operation;
executing, by a calculation engine, the calculation scenario by performing the ranking filter operation to generate a data structure storing a plurality of rows of the one or more database tables responsive to the query, wherein the data structure comprises a mapping of each row in the plurality of rows to partitions of the one or more database tables processed by the calculation engine during execution of the calculation scenario including the ranking filter operation, wherein the ranking filter operation comprises an aggregation operation and a filter operation being performed together and configured to implement dynamic ordering and partitioning;
generating, based on the executing of the calculation scenario and using the data structure, a result data set comprising at least one row from the plurality of rows, wherein generating the result data set comprises:
  splitting the one or more database tables into parts,
  generating, for each of the parts, separate data structures storing partial data results, and
  combining the partial data results from each of the parts,
detecting, by a persistence layer, a restart of the application server associated with a crash of a network-attached storage system of the application server;
determining a portion of the result data set associated with unfinished transactions; and
providing, by the database server to the application server, the result data set excluding the portion of the result data set associated with the unfinished transactions that are identified using log buffers reordered from inconsecutive log segments of the partitions during a recovery process executed after the crash of the network-attached storage system of the application server.

12. The system of claim 11, wherein generating further comprises selecting the at least one row in the result data set from the plurality of rows based on the mapping.

13. The system of claim 12, wherein at least one partition in the partitions in the mapping is configured to map to another data structure storing one or more rows for inclusion in the result data set.

14. The system of claim 13, wherein the result data set comprises a predetermined number of rows.

15. The system of claim 13, wherein the one or more rows in the another data structure are selected based on one or more ordering attributes defining a predetermined order of execution of operations of the query on the partitions of the one or more database tables.

16. A computer program product comprising a non-transitory machine-readable medium storing instructions that, when executed by at least one programmable processor, cause the at least one programmable processor to perform operations comprising:
  receiving, by a database server from an application server, a query associated with a calculation scenario defining a data flow model that comprises one or more calculation nodes, each of the one or more calculation nodes corresponding to an operation being performed on one or more database tables stored at a database, the one or more calculation nodes comprising a first calculation node corresponding to a ranking filter operation;
  executing, by a calculation engine, the calculation scenario by performing the ranking filter operation to generate a data structure storing a plurality of rows of the one or more database tables responsive to the query, wherein the data structure comprises a mapping of each row in the plurality of rows to partitions of the one or more database tables processed by the calculation engine during execution of the calculation scenario including the ranking filter operation, wherein the ranking filter operation comprises an aggregation operation and a filter operation being performed together and configured to implement dynamic ordering and partitioning;
  generating, based on the executing of the calculation scenario and using the data structure, a result data set comprising at least one row from the plurality of rows, wherein generating the result data set comprises:
  splitting the one or more database tables into parts,
    generating, for each of the parts, separate data structures storing partial data results, and
    combining the partial data results from each of the parts,
  detecting, by a persistence layer, a restart of the application server associated with a crash of a network-attached storage system of the application server;
  determining a portion of the result data set associated with unfinished transactions; and
  providing, by the database server to the application server, the result data set excluding the portion of the result data set associated with the unfinished transactions that are identified using log buffers reordered from inconsecutive log segments of the partitions during a recovery process executed after the crash of the network-attached storage system of the application server.

* * * * *